(12) United States Patent
Kim

(10) Patent No.: US 7,668,051 B2
(45) Date of Patent: Feb. 23, 2010

(54) METHODS, APPARATUS AND COMPUTER PROGRAM PRODUCTS FOR DETECTING OSCILLATION OF A SERVO CONTROLLER

(75) Inventor: Jeong-hun Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 544 days.

(21) Appl. No.: 11/272,607

(22) Filed: Nov. 14, 2005

(65) Prior Publication Data
US 2006/0120227 A1 Jun. 8, 2006

(30) Foreign Application Priority Data
Nov. 15, 2004 (KR) ...................... 10-2004-0092998

(51) Int. Cl.
*G11B 7/00* (2006.01)
*G11B 20/18* (2006.01)
(52) U.S. Cl. ............... 369/44.25; 369/44.32; 369/53.28
(58) Field of Classification Search ........................ None
See application file for complete search history.

(56) References Cited

U.S. PATENT DOCUMENTS

| | | | | |
|---|---|---|---|---|
| 5,123,002 A | * | 6/1992 | Tateishi | ................. 369/44.32 |
| 5,231,619 A | * | 7/1993 | Ohtsuka | ................. 369/44.35 |
| 5,399,849 A | | 3/1995 | Jung | |
| 5,432,764 A | * | 7/1995 | Chiyomatsu | ............. 369/44.25 |
| 6,256,275 B1 | * | 7/2001 | Eguchi et al. | ............. 369/44.32 |
| 2004/0165493 A1 | * | 8/2004 | Fukui | ..................... 369/44.32 |

FOREIGN PATENT DOCUMENTS

| | | |
|---|---|---|
| JP | 11-025470 | 1/1999 |
| JP | 2003-045045 | 2/2003 |

OTHER PUBLICATIONS

Preliminary Notice of First Office Action, Taiwan Application No. 094139385, Feb. 24, 2009, 11 pages.
Second Office Action, Chinese Patent Application No. 2005101248043, Apr. 24, 2009.

* cited by examiner

*Primary Examiner*—Joseph H Feild
*Assistant Examiner*—Christopher R Lamb
(74) *Attorney, Agent, or Firm*—Myers Bigel Sibley & Sajovec

(57) ABSTRACT

An apparatus for detecting an oscillation of a servo controller of an optical disk is provided. An oscillation detector, electrically coupled to the servo controller of the optical disk, is provided and is configured to receive an error signal associated with the servo controller. The oscillation detector is further configured to compare an amplitude, a width and a period of the error signal with a reference amplitude, a reference width and reference period to determine if an oscillation is present in the error signal. Related methods and computer program products are provided.

22 Claims, 3 Drawing Sheets

METHODS, APPARATUS AND COMPUTER PROGRAM PRODUCTS FOR DETECTING OSCILLATION OF A SERVO CONTROLLER

CLAIM OF PRIORITY

This application is related to and claims priority from Korean Patent Application No. 10-2004-0092998, filed on Nov. 15, 2004 in the Korean Intellectual Property Office, the disclosure of which is hereby incorporated herein by reference as if set forth in its entirety.

FIELD OF THE INVENTION

The present invention relates to optical disk devices and related methods of operating devices and, more particularly, methods, systems and computer program products for detecting an oscillation of a servo controller.

BACKGROUND OF THE INVENTION

A servo controller of an optical disk device typically controls an actuator to trace tracks of a disk and maintains a predetermined distance between the actuator and the disk. The servo controller is configured to detect the frequency characteristic of the actuator to feed it back (feedback loop).

However, the frequency characteristic of the actuator may vary due to, for example, a defect of the actuator or deterioration of the optical disk. This may decrease frequency margin or gain margin of the entire loop and, thereby, may cause oscillation. The oscillation may cause the actuator to be displaced from the track of the disk or an undesirable variation of the distance between the actuator and the optical disk. The likelihood that the actuator will be displaced by the oscillation and/or an undesirable variation of the distance between the actuator and the optical disk may be present may be reduced by, for example, pre-checking and corresponding actions.

SUMMARY OF THE INVENTION

Some embodiments of the present invention provide an apparatus for detecting an oscillation of a servo controller of an optical disk. An oscillation detector, electrically coupled to the servo controller of the optical disk, is provided and is configured to receive an error signal associated with the servo controller. The oscillation detector is further configured to compare an amplitude, a width and a period of the error signal with a reference amplitude, a reference width and reference period to determine if an oscillation is present in the error signal.

In further embodiments of the present invention, the apparatus may further include a first register, electrically coupled to the oscillation detector, which is configured to store the reference amplitude, the reference width, and the reference period. In certain embodiments of the present invention, the error signal may be a focusing/tracking error signal that is input into the servo controller.

In still further embodiments of the present invention, the oscillation detector may be further configured to set a first flag and activate a detecting signal if it may be determined that the amplitude of the error signal is greater than the reference amplitude. A width of the detecting signal may be compared to the reference width and a second flag is set if it is determined that the width of the detecting signal is greater than the reference width. A time interval may be measured between first and second detecting signals and a third flag may be set if the time interval between the first and second detecting signals is greater than the reference period. An oscillation may be present if the first, second and third flags are all set.

In some embodiments of the present invention, an interrupt control circuit may be configured to generate an interrupt signal if it is determined that an oscillation is present in the error signal. The interrupt control circuit may be further configured to provide the interrupt signal to a micro-controller, electrically coupled to the servo controller. The microcontroller may be configured to decrease a speed and/or a loop gain of the optical disk responsive to the interrupt signal.

In further embodiments of the present invention, the oscillation detector may be further configured to repeatedly receive and compare until a threshold number of oscillations is reached. A second register, electrically coupled to the oscillation detector, may be configured to store the threshold number of oscillations. An oscillation counter, electrically coupled to the second register, may be configured to count the number of the oscillations. The reference amplitude, the reference width and the reference period may be user customizable.

While the present invention is described above primarily with reference to apparatus, related methods and computer program products are also provided herein.

DETAILED DESCRIPTION OF EMBODIMENTS OF THE PRESENT INVENTION

Figure 1:
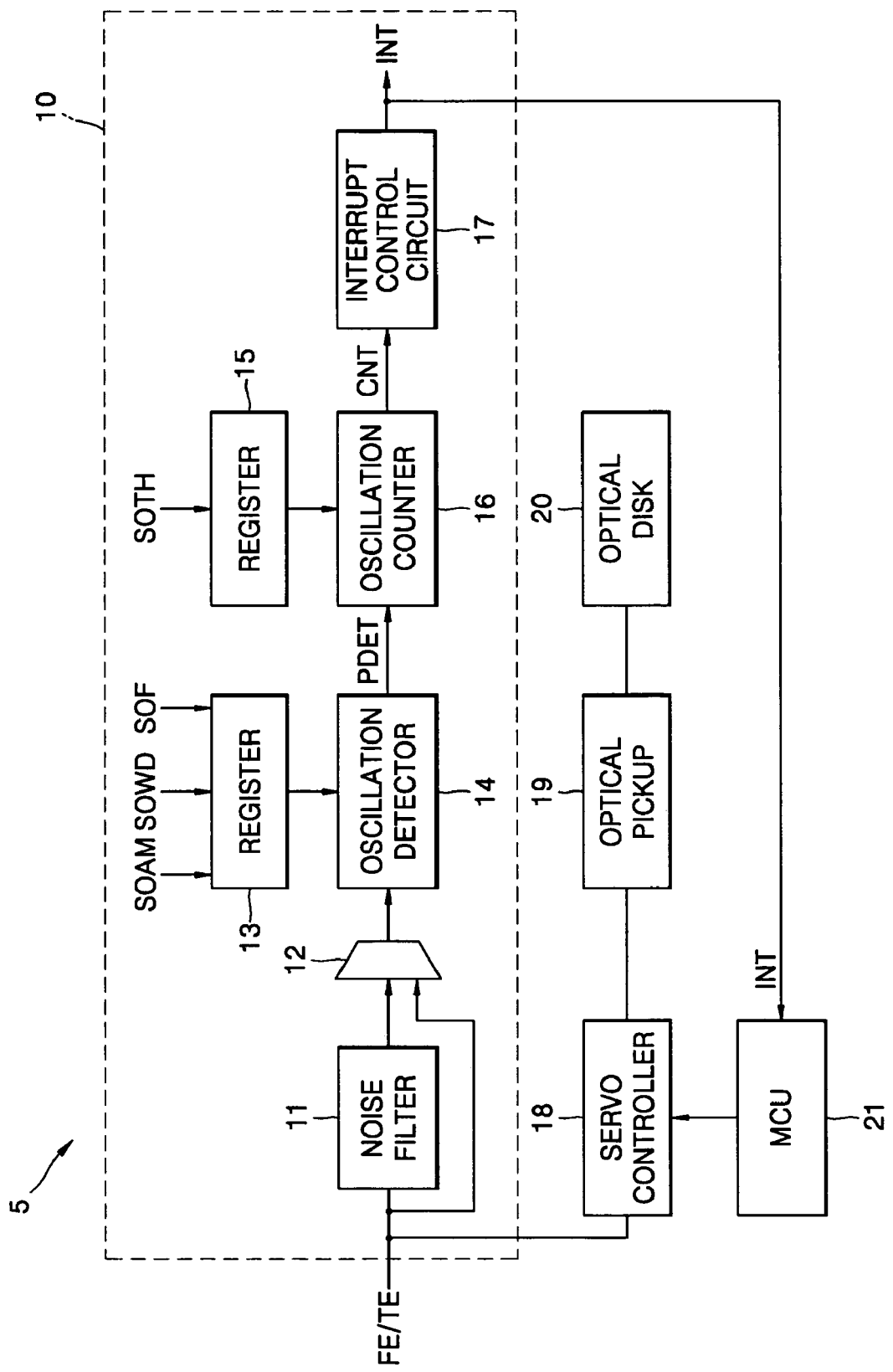
FIG. 1 is a block diagram illustrating a system including an apparatus for detecting an oscillation of a servo controller according to some embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element discussed below could be termed a second element, and similarly, a second element may be termed a first element without departing from the teachings of the present invention.

As will be appreciated by one of skill in the art, the invention may be embodied as a method, data processing system, or computer program product. Accordingly, the present invention may take the form of an entirely hardware embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or in a visually oriented programming environment, such as VisualBasic.

The invention is described in part below with reference to flowchart illustrations and/or block diagrams of methods, systems and computer program products according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Embodiments of the present invention will now be discussed with respect to FIGS. 1 through 3. Referring first to FIG. 1, a block diagram of a system 5 including an apparatus 10 according to some embodiments of the present invention will be discussed. It will be understood that a optical disk recording/reproducing system that records data on or reproduces data from a track of the optical disk typically includes an optical pickup that records encoded data on the optical disk or extracts a Radio Frequency (RF) signal from write data recorded on the optical disk, a servo controller that controls an actuator to trace tracks of the disk and maintains a predetermined distance between the actuator and the disk, an encoder that transmits the encoded data to the optical pickup, a decoder that reproduces the data from the optical disk by decoding the RF signal output from the optical pickup, a defect detector that detects a defect block using the RF signal and reads position information regarding the defect block, a Microcontroller Unit (MCU), a Read Only Memory (ROM), and a Random Access Memory (RAM). The MCU controls the optical pickup, the encoder, and the decoder to perform a read/write operation of the system, and controls the read/write operation using firmware stored in the ROM. The firmware is a program used to control overall operations of the system. Embodiments of the present invention are not limited to the elements of an optical disk recording/reproducing system discussed above. Only certain of these elements are illustrated in FIG. 1.

As illustrated in FIG. 1, the system 5 includes a servo controller 18, an optical pickup 19, an optical disk 20, a MCU 21 and an apparatus for detecting an oscillation 10 according to some embodiments of the present invention. As further illustrated in FIG. 1, the apparatus for detecting an oscillation 10 includes a noise filter 11, a selector 12, a first register 13, an oscillation detector 14, a second register 15, an oscillation counter 16, and an interrupt control circuit 17.

The noise filter 11 is configured to receive a focusing/tracking error signal FE/TE, which is an input signal of a servo controller 18 (as illustrated), and remove noise from the signal focusing/tracking error signal FE/TE. The selector 12 is configured to receive an output signal of the noise filter 11 and selectively output the output signal of the noise filter 11. In some embodiments of the present invention, the selector 12 may be configured to directly output the error signal FE/TE.

Generally, the error signal FE/TE varies between a high voltage level and a relatively low voltage level, centered on a reference voltage. When an oscillation occurs, the error signal FE/TE may vary above the high voltage level and/or below the low voltage level as illustrated in the timing diagram of FIG. 2. The amplitude (AM), width (WD) and period (T) of the error signal FE/TE may be compared with reference values to determine if an oscillation is present in the error signal FE/TE.

In particular, the first register 13 may be configured to store a reference amplitude SOAM, a reference width SOWD, and a reference period SOF. The reference amplitude SOAM, the reference width SOWD and the reference period SOF may be user customizable, i.e., set by a user. The oscillation detector 14 may be configured to compare the reference amplitude SOAM, the reference width SOWD and the reference period SOF stored in the first register 13 with the amplitude, width and period of the error signal FE/TE to determine if an oscillation is present in the error signal FE/TE.

Figure 2:
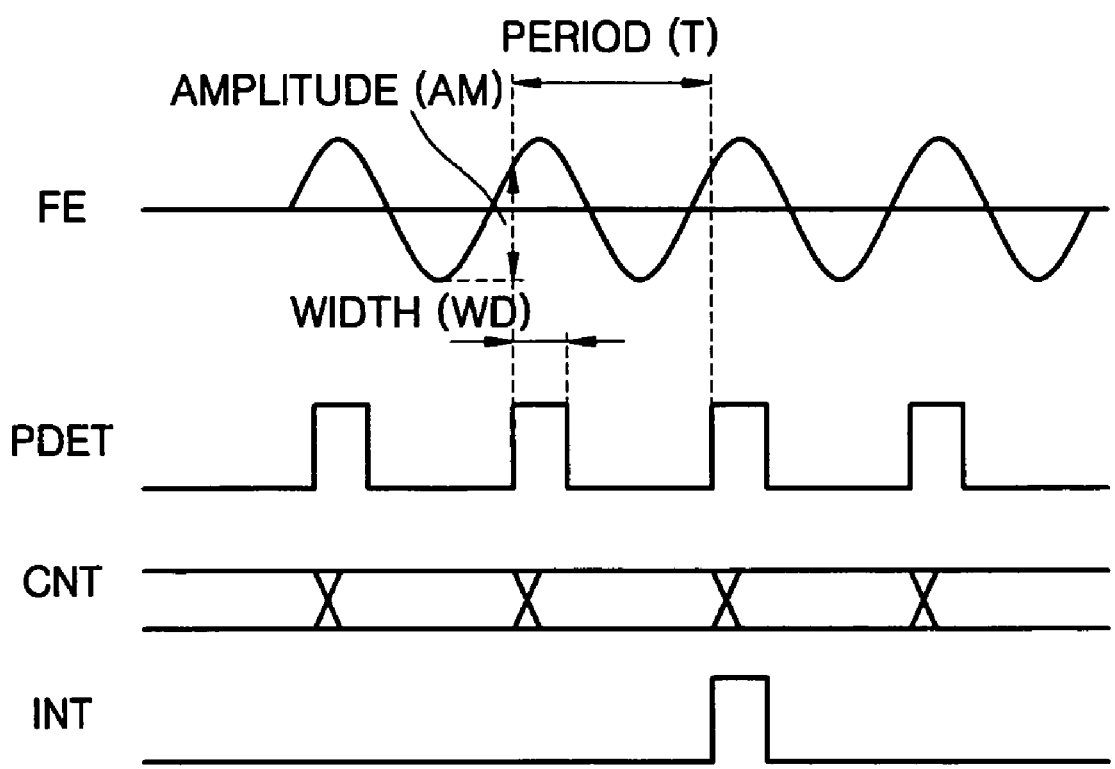
FIG. 2 is a timing diagram illustrating timing of operations of the apparatus of FIG. 1 according to some embodiments of the present invention.
Figure 3:
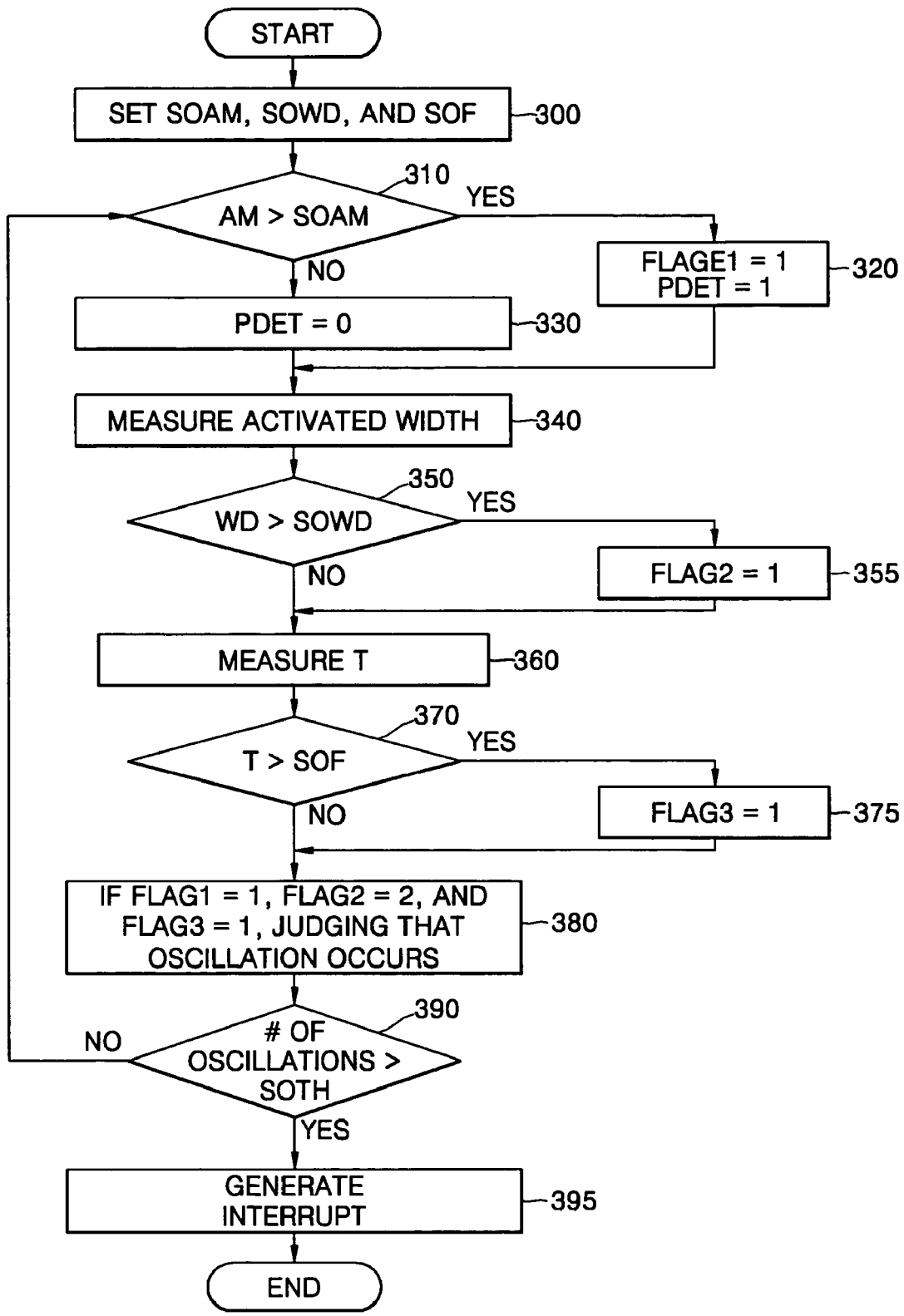
FIG. 3 is a flowchart illustrating operations for detecting an oscillation of a servo controller according to some embodiments of the present invention.

As illustrated in FIG. 2, the oscillation detector 14 is configured to activate a detecting signal PDET, for example, set the detecting signal PDET to a logic high level ("logic 1") when the amplitude of the error signal FE/TE is greater than the reference amplitude SOAM. The oscillation detector 14 may be further configured to determine if a width WD of the detecting signal PDET is greater than the reference width SOWD and if a time period (T) between the widths WD of the detecting signal PDET is greater than the SOF. In some embodiments of the present invention, if a width WD of the detecting signal PDET is greater than the reference width SOWD and if a time period (T) between the widths WD of the detecting signal PDET is greater than the SOF, an oscillation is present in the error signal FE/TE. It will be understood that only the FE signal is illustrated in FIG. 2 for exemplary purposes.

In some embodiments of the present invention, multiple oscillations may be detected before it is determined that an oscillation is present. Thus, an actual oscillation may be distinguished from a one-time disturbance or distortion of the error signal FE/TE. In these embodiments of the present invention, the apparatus for detecting an oscillation 10 may also include a second register 15 and an oscillation counter 16 as illustrated in FIG. 1. The second register 15 may be configured to store a threshold number of oscillations (threshold value) SOTH that may be user customizable. The oscillation counter 16 may be configured to count the number of the oscillations detected by the oscillation detector 14 and determine if an actual oscillation is present based on when the number of oscillations is greater than the threshold value SOTH.

The interrupt control circuit 17 is configured to generate an interrupt signal INT and provide the interrupt signal to a MCU 21 if it is determined that an oscillation is present. The MCU 21 may be configured to decrease a speed or a loop gain of an optical disk 20 in response to the interrupt signal INT to increase a gain margin and, thereby, possibly stop the oscillation before the actuator is displaced from the track of the disk or an undesirable variation of the distance between the actuator and the optical disk occurs.

Operations according to various embodiments of the present invention will now be discussed with respect to the flowchart of FIG. 3. Operations begin at block 300 by storing a reference amplitude SOAM, a reference width SOWD and a reference period SOF. These values may be user customizable. It is determined if an amplitude AM of the error signal FE/TE is greater than the stored reference amplitude SOAM (block 310). If it is determined that the amplitude AM of the input error signal FE/TE is greater than the reference amplitude SOAM (block 310), a first flag FLAG1 is set to a logic high level (logic "1") and a detecting signal PDET is activated to a logic high level (logic "1") (block 320). If, on the other hand, it is determined that the amplitude AM of the input error signal FE/TE is less than the reference amplitude SOAM (block 310), the detecting signal PDET is deactivated to a logic low (logic "0") (block 330).

A width WD of the detecting signal PDET is measured (block 340). It is determined if the width WD of the detecting signal PDET is greater than the width of the reference width SOWD (block 350). If it is determined that the width WD of the detecting signal PDET is greater than the reference width SOWD, a second flag FLAG2 is set to a logic high level (logic "1") (block 355).

A time interval (T) between the detecting signals PDET is measured (block 360). It is determined if the measured time interval (T) is greater than the reference period SOF (block 370). If it is determined that the time interval (T) is greater than the reference period SOF (block 370), a third flag FLAG3 is set to a logic high level (logic "1") (block 375). It is determined if all three flags have been set to a logic high level, i.e., FLAG1, FLAG2 and FLAG3 (block 380). An oscillation may be present if it is determined that all of three flags have been set.

In some embodiments of the present invention, the operations of block 310 through 380 may be repeated in order to detect multiple, successive oscillations to distinguish an actual oscillation from a one-time disturbance or distortion of the signal FE/TE. Thus, as further illustrated in the flowchart of FIG. 3, it is determined if a threshold number of oscillations has been met (block 390). The threshold number may be user customizable. If it is determined that the threshold number of oscillations is met or exceeded (the number of the oscillations is counted) (block 390), it is determined that an actual oscillation is present and an interrupt may be generated (block 395). The interrupt signal may be provided to a MCU. The MCU may be configured to decrease a speed or a loop gain of the optical disk responsive to the interrupt signal to remove the oscillation. If, on the other hand, if it is determined that the threshold number of oscillations is not met or not exceeded (block 390), operations of blocks 310 through 380 may repeat until it is determined that the threshold has been exceeded (block 390).

As described above with respect to FIGS. 1 through 3, some embodiments of the present invention may be used to detect oscillation and, thereby, enable the removal of the oscillation, such that a likelihood that the optical disk will malfunction and or break may be reduced.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An apparatus for detecting an oscillation of a servo controller of an optical disk, comprising:
    an oscillation detector, electrically coupled to the servo controller of the optical disk, configured to receive an error signal associated with the servo controller and compare an amplitude, a width and a period of the error signal with a reference amplitude, a reference width and reference period to determine if an oscillation is present in the error signal, wherein the oscillation detector is further configured to:
    set a first flag and activate a first detecting signal if it is determined that the amplitude of the error signal is greater than the reference amplitude;
    compare a width of the first detecting signal to the reference width and set a second flag if it is determined that the width of the first detecting signal is greater than the reference width; and
    measure a time interval between the first detecting signal and a second detecting signal and set a third flag if the time interval between the first and second detecting signals is greater than the reference period, wherein an oscillation is present if the first, second and third flags are all set.

2. The apparatus of claim 1, further comprising a first register, electrically coupled to the oscillation detector, configured to store the reference amplitude, the reference width, and the reference period.

3. The apparatus of claim 1, wherein the error signal is a focusing/tracking error signal that is input into the servo controller.

4. The apparatus of claim 1, further comprising an interrupt control circuit configured to generate an interrupt signal if it is determined that an oscillation is present in the error signal.

5. The apparatus of claim 4, wherein the interrupt control circuit is further configured to provide the interrupt signal to a micro-controller, electrically coupled to the servo controller, the microcontroller being configured to decrease a speed and/or a loop gain of the optical disk responsive to the interrupt signal.

6. The apparatus of claim 1, wherein the oscillation detector is further configured to repeatedly receive and compare until a threshold number of oscillations is reached.

7. The apparatus of claim 6, further comprising:
- a second register, electrically coupled to the oscillation detector, configured to store the threshold number of oscillations; and
- an oscillation counter, electrically coupled to the second register, configured to count the number of the oscillations.

8. The apparatus of claim 1, wherein the reference amplitude, the reference width and the reference period are user customizable.

9. A method for detecting an oscillation of a servo controller of an optical disk, comprising:
- receiving an error signal associated with the servo controller;
- comparing an amplitude, a width and a period of the error signal with a reference amplitude, a reference width and reference period to determine if an oscillation is present in the error signal;
- setting a first flag and activating a first detecting signal if it is determined that the amplitude of the error signal is greater than the reference amplitude;
- comparing a width of the first detecting signal to the reference width and setting a second flag if it is determined that the width of the first detecting signal is greater than the reference width; and
- measuring a time interval between the first detecting signal and a second detecting signal and setting a third flag if the time interval between the first and second detecting signals is greater than the reference period, wherein an oscillation is present if the first, second and third flags are all set.

10. The method of claim 9, further comprising storing the reference amplitude, the reference width, and the reference period.

11. The method of claim 9, wherein the error signal is a focusing/tracking error signal that is input into the servo controller.

12. The method of claim 9, further comprising generating an interrupt signal if it is determined that an oscillation is present in the error signal.

13. The method of claim 12, further comprising:
- providing the interrupt signal to a microcontroller unit, electrically coupled to the servo controller; and
- decreasing a speed and/or a loop gain of the optical disk responsive to the interrupt signal at the microcontroller unit.

14. The method of claim 9, further comprises repeatedly receiving and comparing until a threshold number of oscillations is reached.

15. The method of claim 14, further comprising:
- storing the threshold number of oscillations; and
- counting the number of the oscillations.

16. The method of claim 9, wherein the reference amplitude, the reference width and the reference period are user customizable.

17. A computer program product for detecting an oscillation of a servo controller of an optical disk, the computer program product comprising:
- computer readable storage medium having computer readable program code embodied in said medium, the computer readable program code comprising:
- computer readable program code configured to receive an error signal associated with the servo controller;
- computer readable program product configured to compare an amplitude, a width and a period of the error signal with a reference amplitude, a reference width and reference period to determine if an oscillation is present in the error signal;
- computer readable program code configured to set a first flag and activate a first detecting signal if it is determined that the amplitude of the error signal is greater than the reference amplitude;
- computer readable program code configured to compare a width of the first detecting signal to the reference width and set a second flag if it is determined that the width of the first detecting signal is greater than the reference width; and
- computer readable program code configured to measure a time interval between the first detecting signal and a second detecting signal and set a third flag if the time interval between the first and second detecting signals is greater than the reference period, wherein an oscillation is present if the first, second and third flags are all set.

18. The computer program product of claim 17, further comprising computer readable program code configured to store the reference amplitude, the reference width, and the reference period.

19. The computer program product of claim 17, further comprising computer program code configured to generate an interrupt signal if it is determined that an oscillation is present in the error signal.

20. The computer program product of claim 19, further comprising:
- computer readable program code configured to provide the interrupt signal to a microcontroller unit, electrically coupled to the servo controller; and
- computer readable program code configured to decrease a speed and/or a loop gain of the optical disk responsive to the interrupt signal at the microcontroller unit.

21. The computer program product of claim 17, further comprising computer readable program code configured to repeatedly receive and compare until a threshold number of oscillations is reached.

22. The computer program product of claim 21, further comprising:
- computer readable program code configured to store the threshold number of oscillations; and
- computer readable program code configured to count the number of the oscillations.

* * * * *